United States Patent
Schmidt et al.

[11] Patent Number: 6,102,146
[45] Date of Patent: Aug. 15, 2000

[54] METHOD OF ADJUSTING THE ENGINE BRAKING PERFORMANCE OF A SUPERCHARGED INTERNAL-COMBUSTION ENGINE

[75] Inventors: Erwin Schmidt, Baltmannsweiler; Siegfried Sumser, Stuttgart, both of Germany

[73] Assignee: DaimlerChrysler AG, Stuttgart, Germany

[21] Appl. No.: 09/359,717

[22] Filed: Jul. 23, 1999

[30] Foreign Application Priority Data

Jul. 23, 1998 [DE] Germany .......................... 198 33 147

[51] Int. Cl.[7] .................................................. F02D 23/00
[52] U.S. Cl. .......................... 180/197; 60/602; 123/322
[58] Field of Search ............................... 180/197; 701/82, 701/84

[56] References Cited

U.S. PATENT DOCUMENTS

| | | | |
|---|---|---|---|
| 4,961,145 | 10/1990 | Gernot | 364/426.02 |
| 5,127,501 | 7/1992 | Arikawa | 192/1.22 |
| 5,146,890 | 9/1992 | Gobert et al. | 123/321 |
| 5,727,856 | 3/1998 | Kost et al. | 303/195 |
| 5,894,731 | 4/1999 | Hakansson | 60/602 |
| 5,967,115 | 10/1999 | Konopka et al. | 123/322 |
| 6,000,221 | 12/1999 | Church et al. | 60/602 |

FOREIGN PATENT DOCUMENTS

| | | |
|---|---|---|
| 3820408 A1 | 1/1989 | Germany . |
| 19637999 A1 | 3/1998 | Germany . |

*Primary Examiner*—Brian L. Johnson
*Assistant Examiner*—Tony Winner
*Attorney, Agent, or Firm*—Evenson, McKeown, Edwards & Lenahan, P.L.L.C.

[57] ABSTRACT

A method adjusts the engine braking performance of a supercharged internal-combustion engine. The exhaust gas turbocharger of the internal-combustion engine is provided with a variably adjustable turbine geometry for changing the effective turbine cross-section. In order to be able to transmit high brake powers, while the directional control is simultaneously high, a wheel slip control is implemented in the engine braking operation. The rotational speed of at least one wheel is measured and is compared with a reference value. In the event of a deviation of the measured rotational wheel speed from the reference value, a control signal is generated and fed to a control element which acts upon the variable turbine geometry for reducing the wheel slip.

20 Claims, 2 Drawing Sheets

METHOD OF ADJUSTING THE ENGINE BRAKING PERFORMANCE OF A SUPERCHARGED INTERNAL-COMBUSTION ENGINE

BACKGROUND OF THE INVENTION

This application claims the priority of 198 33 147.9-13, filed Jul. 23, 1999, the disclosure of which is expressly incorporated by reference herein.

The present invention relates to a method of adjusting the engine braking performance of a supercharged internal-combustion engine provided with a variably adjustable turbine geometry for changing the effective turbine cross-section.

DE 196 37 999 A1 describes an internal-combustion engine whose exhaust gas turbocharger can also be used for an engine braking. The turbine of the exhaust gas turbocharger has a variably adjustable turbine geometry, which in the engine braking operation is changed into a ram position reducing the nozzle cross-section of the turbine. An increased exhaust back pressure is thereby achieved. The exhaust gas flows at a high flow rate through ducts between guide blades of the turbine geometry and acts upon the turbine wheel which drives the compressor, whereupon an excess pressure builds up in the intake system.

As a result of the foregoing, the cylinder is acted upon by an increased supercharging pressure on the input side. On the output side, an excess pressure exists between the cylinder outlet and the exhaust gas turbocharger. This excess pressure counteracts a blowing-off of the air compressed in the cylinder by way of decompression valves into the exhaust gas system. In the engine braking operation, during the compression and push-out stroke, the piston must carry out decompression work against the high excess pressure in the exhaust gas system, whereby a strong braking effect is achieved.

Furthermore, DE 196 37 999 A1 teaches subjecting the engine braking performance to an automatic control in order to either be able to maintain a constant desired speed or brake the vehicle to zero within the shortest time possible. For example, in a danger situation in the latter situation, a maximal braking performance is required.

In principle, the directional control of the vehicle must also be taken into account during all braking maneuvers. This applies particularly to fully loaded utility vehicles and during critical road conditions, particularly in snow and ice.

SUMMARY OF THE INVENTION

An object of the present invention to provide a method for adjusting the engine braking performance of a supercharged internal-combustion engine by way of which high braking performances can be transmitted while the directional control is good.

According to the present invention, this object has been achieved by a method in which in the engine braking operation, a wheel slip control is carried out in that the rotational speed ($n_R$) of at least one wheel with a reference value ($n_M$), in that, in the event of a deviation of the measured rotational wheel speed ($n_R$) from the reference value ($n_M$), generating and feeding a control signal is generated which is fed to a control element for reducing the wheel slip, which control element acts upon the variable turbine geometry, a control signal being generated which expands the effective turbine cross-section of the variable turbine geometry if the rotational wheel speed ($n_R$) is higher than a corresponding reference value formed from the rotational engine speed ($n_M$).

The engine brake is combined with a wheel slip control, whereby an unacceptably high slip buildup is avoided at the vehicle wheels and a maximal transmitting of moments to the road is achieved. On one hand, the braking torque generated in the engine can actually be reduced by the control intervention. On the other hand, the braking torque, which can be transmitted to the road, is increased because no braking performance losses can be generated by wheel slip. Thereby the vehicle can, on the whole, be braked within a shorter time period.

The control intervention results in a permanent static friction between the wheels and the road so that the generated engine braking performance is completely transmitted to the road.

Consequently, a rotational speed drop is possibly prevented which can occur in the event of a slip if no equivalent output torque stands in the way of the engine braking performance.

The steerability of the vehicle is maintained simultaneously because the controlled, essentially slip-free wheel is capable of transmitting cornering forces which are significantly responsible for the directional control of the vehicle. Thus, high engine braking performances can be transmitted which, particularly in engine braking devices using variable turbine geometries in utility vehicles, can reach approximately 500 kW, without impairing the directional control.

The slip control is implemented by determining the rotational speed of at least one vehicle wheel and comparing that speed with a reference value. In the event of a deviation of the actual rotational speed from the desired rotational speed of the respective wheel, a control signal is generated which is used for adjusting the variable turbine geometry of the turbine of the exhaust gas turbocharger. In the method of the present invention, the variable turbine geometry is used as an actively controlled engine component. Additional components are not required for adjusting the maximally transmissible engine braking performance. As a matter of fact, only components are used which are required anyhow for the engine braking, and this too results in cost advantages.

As a defined target, a constant vehicle speed selected by the driver can, for example, be used or the goal to brake the vehicle a fast as possible. In each case, the goal can be reached faster and more reliably than in the past. That is, although the braking torque generated in the engine may be limited under certain circumstances by the slip control, the braking torque which can be transmitted to the road is maximized.

In an expedient further aspect of the method of the present invention, the reference value for the rotational wheel speed is formed from the rotational engine speed while taking into account the transmission ratio. For increasing the control sensitivity, in addition or as an alternative to the control on the position plane, by a one-time or two-time differentiation, the rotational speeds on the speed plane or acceleration plane can also be taken into account. Comparison of the actual rotational wheel speed with the desired rotational speed determined from the rotational engine speed has the advantage that also the lowest slip tendencies between the wheel and the road surface can be recognized.

When an axial thrust turbine is used, the variable turbine geometry is preferably constructed as axially adjustable guide baffles. Other turbine constructions with a variable turbine geometry can also be used, however, particularly rotary blade turbines or flap-type turbines. In addition to adjusting the variable turbine geometry, other components assigned to the exhaust gas turbocharger or the engine can also be used for the slip control. The control of a blow-off device for reducing the exhaust back pressure as well as the control of the lift of brake valves at the cylinder outlet have also been found to be advantageous. Finally, it may also be expedient to control the fuel injection in order to promote the braking effect by a reduction of the driving performance and to generate no moments in the opposite direction.

The engine brake is preferably combined with the wheel brake. Thereby, the highest possible braking performance fraction is advantageously carried out by the engine brake in order to minimize as much as possible the wear of the mechanically acting wheel brake. The wheel brake is expediently connected in the event that the braking performance can no longer be generated by the engine brake alone.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
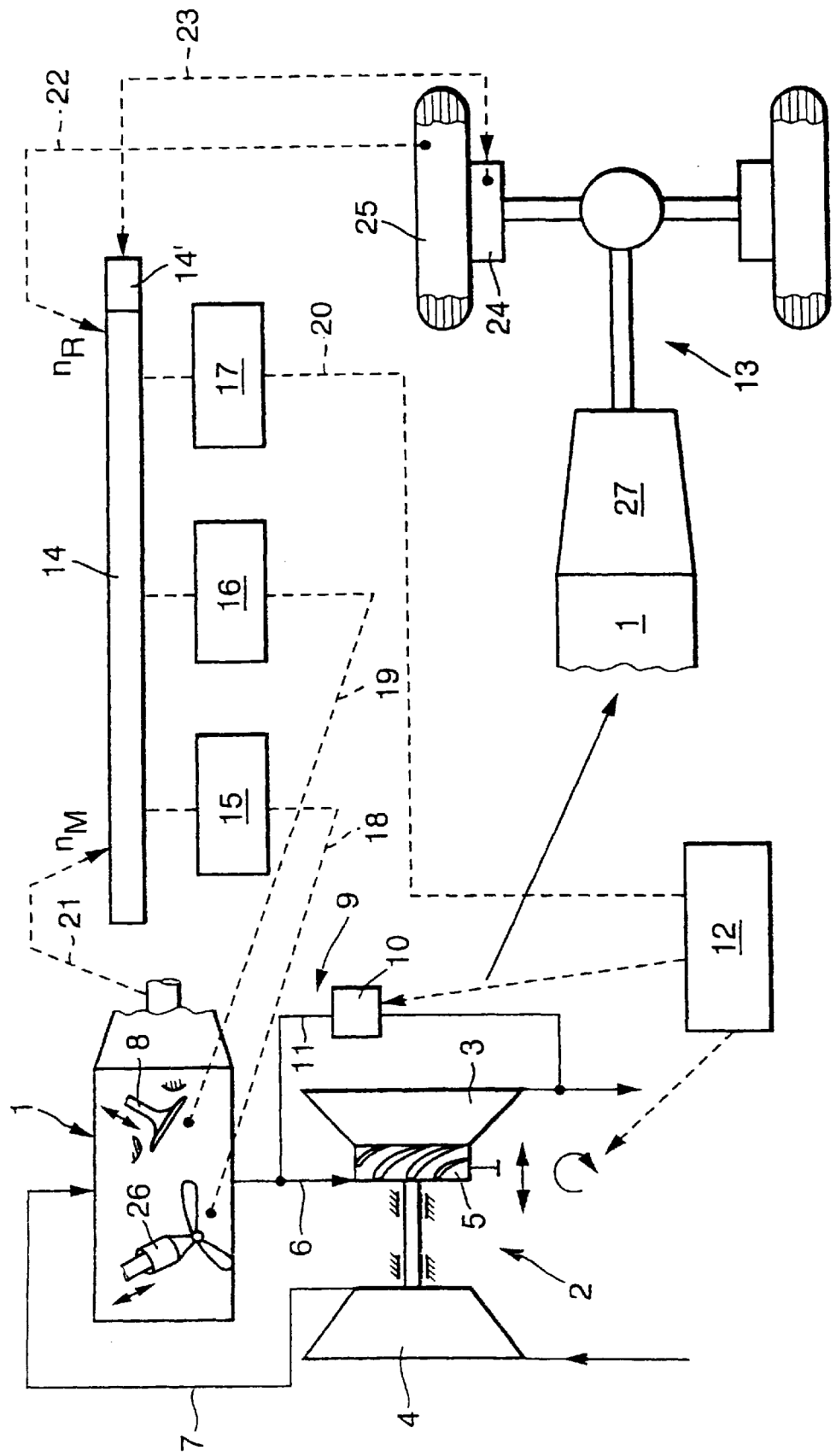
FIG. 1 is a schematic view of a supercharged internal-combustion engine.

The internal-combustion engine 1 in FIG. 1 is part of a vehicle 13, particularly a utility vehicle, and has an exhaust gas turbocharger 2 with a variable turbine 3 in the exhaust gas system 6 and a compressor 4 in the intake system 7. The variable turbine 3, as an axial thrust turbine, is constructed with a variably adjustable turbine geometry in the form of axially displaceable guide baffles 5. The variable turbine 3 is driven by the pressurized exhaust gases in the exhaust gas system 6 between the cylinder outlet of the internal-combustion engine and the turbine inlet and, in turn, by way of a shaft, drives the compressor 4 which compresses the taken-in fresh air to an increased supercharging pressure. The compressed air is fed to the cylinder inlet of the internal-combustion engine 1 and results in an increase of the engine driving performance.

The exhaust gas turbocharger 2 can also be utilized in the engine braking operation for generating engine braking power. The axially displaceable guide baffles 5 of the variable turbine 3 are changed for this purpose into a ram position in which the effective turbine cross-section is reduced. As a result, an increased exhaust back pressure is built up. The exhaust gas thus flows at an increased flow rate through ducts between the guide blades of the guide baffles 5 and arrives on the turbine wheel driving the compressor 4, so that an excess pressure is generated also in the intake system. Simultaneously, brake valves 8 on the cylinder outlet of the internal-combustion engine 1 are opened, whereby the air compressed in the cylinder can be blown off into the exhaust gas system 6. The braking performance can be influenced by the position of the guide baffles 5 and the resulting adjustment of the turbine inlet cross-section.

In addition, a blow-off device 9 is provided which has a blow-off valve 10 in a bypass pipe 11 for bridging the turbine 3. When the blow-off valve 10 is open, at least a portion of the exhaust gas is guided upstream of the turbine 3 by way of the bypass pipe 11 into the pipe section of the exhaust gas system downstream of the turbine. The guide baffles 5 and the blow-off valve 10 can be adjusted independently of one another by a control element 12.

The internal-combustion engine 1, the exhaust gas turbocharger 2 as well as diverse components of the vehicle 13 influencing the driving dynamics are automatically controlled by a controller 14. The controller 14 contains different processing units 14', 15, 16, 17 and communicates by way of signal lines 18 to 23 with the respective components to be controlled.

By way of the signal line 21, the controller 14 receives information from the internal-combustion engine 1 concerning the actual measured rotational engine speed $n_M$ and by way of the signal line 22, it receives from the vehicle 13 the actual measured rotational wheel speed $n_R$. The processing unit 141 communicates by way of the signal line 23 with a wheel braking device 24 on the wheel 25 of the vehicle 13, by way of which the wheel 25 is mechanically braked. In the processing unit 14', the control signals for the wheel braking device 24 are generated in order to prevent a locking of the wheel 25.

The additional processing units 15, 16 and 17, to which the signal lines 18, 19 and 20 are assigned, are used for adjusting a fuel injection nozzle 26 in the internal-combustion engine 1, for adjusting the brake valve 8 and for adjusting the control element 12 for the guide baffles 5 or the blow-off valve 10.

The controller 14 generates control signals for the engine firing operation as well as for the braking operation. In addition to the mechanical wheel braking device 24 which is applied directly to the wheel 25, the engine brake is also used in the braking operation. In this case, the controller 14 provides for adjustment of the braking power distribution between A the wheel brake and the engine brake. Expediently, the engine brake is mainly used in the braking operation. The wheel brake is connected if the required braking power cannot be generated by the engine brake alone.

In the engine braking operation, the controller 14 prevents the generation of slip between the wheels and the road, whereby a maximum of engine braking power can be transmitted to the road and the directional control is increased. By adjusting the guide baffles 5, the blow-off valve 10, the quantity of the injected fuel and/or of the lift of the brake valve 8, the controller 14 compensates between the rotational wheel speed $n_R$ and a reference value which is determined from the rotational engine speed $n_M$ while taking into account the transmission ratio of the transmission 27. Thereby slip is prevented.

Figure 2:
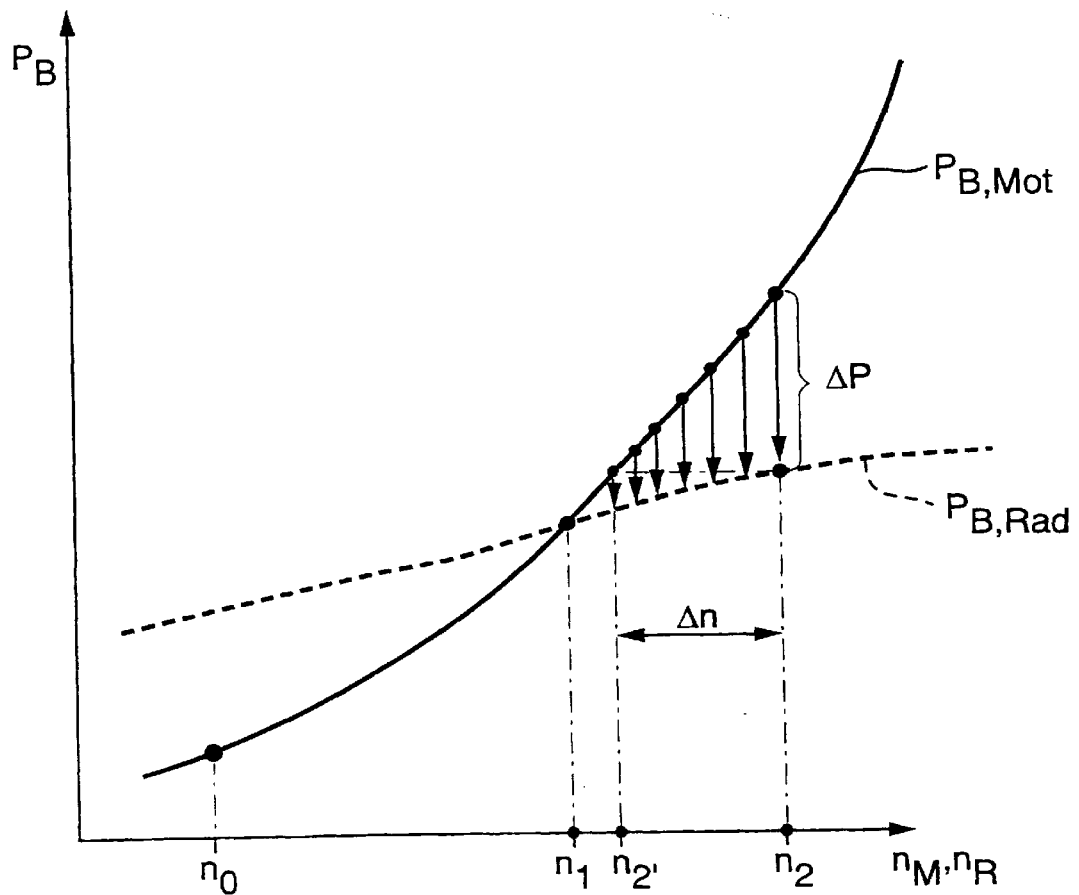
FIG. 2 is a diagram of the transmissible engine braking performance as a function of the rotational speed.

An example of the possible generation of slip in the engine braking operation is illustrated in FIG. 2, in which the engine braking power $P_{B,eng}$ (solid line) is a function of the rotational engine speed $n_M$, and the wheel power $P_{B,wheel}$ (broken line), which can be maximally transmitted to the road by way of the tire forces, is a function of the rotational wheel speed $n_R$. It should be taken into account that the engine braking performance $P_{B,eng}$ is determined relative to the type of construction. In contrast, the wheel power $P_{B,wheel}$, as a function of the road condition, the load, the wheel condition, the weather conditions, etc. depends on a large number of factors which may permanently change. To this extent, the illustrated wheel power $P_{B,wheel}$ course represents one actual, arbitrarily picked course.

The two curves for the engine braking power $P_{B,eng}$ and the wheel power $P_{b,wheel}$ intersect in the range of the rotational speed $n_1$. Below the rotational speed $n_1$, in the range between $n_0$ and $n_1$, the engine braking power $P_{B,eng}$ is below the maximally transmissible wheel power $P_{B,wheel}$, so that in this area the static friction between the wheels and the road is sufficient for transmitting the braking power and the generation of slip does not have to be considered.

At rotational speeds above the rotational speed $n_1$ at the point of intersection, the course of the engine braking power $P_{B,eng}$ is above the course of the maximally transmissible wheel power $P_{B,wheel}$ and slip is generated in this range. As the result of a high static friction, the rotational speed $n_1$ at the point of intersection can be displaced far to the right into high rotational speed ranges. If then, because of unfavorable circumstances, such as poor road conditions, the static friction conditions deteriorate, the rotational speed $n_1$ at the point of intersection is displaced back to the left. If, at this moment, a high engine braking power, as illustrated in rotational speed point $n_2$ is generated in the internal-combustion engine and the transmissible wheel power is clearly below the engine braking power, a power bias $\Delta P = P_{B,eng} - P_{B,wheel}$ occurs which leads to a rotational engine speed reduction $\Delta n$ to the value $n_2'$. The reduction of the rotational engine speed $\Delta n = n_2 - n_2'$ represents the slip between the wheel and the road.

The controller 14 illustrated in FIG. 1 is capable of avoiding this slip so that the engine braking power $P_{B,eng}$ generally remains limited to the maximally transmissible wheel power $P_{B,wheel}$. This results in an optimal directional control, particularly a good steerability of the vehicle.

If the controller 14 determines that the rotational wheel speed $n_R$ is higher than a corresponding reference value formed from the rotational engine speed $n_M$, a control signal is generated which is fed to the control element of the variable turbine geometry in order to enlarge the effective turbine cross-section. The expansion of the turbine cross-section causes a reduction of the exhaust back pressure and a resulting reduction of the flow rate of the exhaust gas through the ducts between the guide blades of the guide baffles, to reduce the supercharging pressure in the cylinder inlet. On the whole, the pressure level and the engine braking power are reduced until the actually generated value of the engine braking power is again below the corresponding value of the wheel power and the generation of slip is excluded.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of adjusting engine braking performance of a supercharged internal-combustion engine having an exhaust gas turbocharger with a variable adjustable turbine geometry for changing an effective turbine cross-section thereof, comprising the steps of, in the engine braking operation, carrying out a wheel slip control measuring and comparing a rotational speed of at least one wheel with a reference value; generating and feeding a control signal to a control element with a deviation of the measured rotational wheel speed from the reference value, to change the variable turbine geometry for reducing the wheel slip; and using the control signal to expand the effective turbine cross-section when the rotational wheel speed is higher than a corresponding reference value formed from the rotational engine speed.

2. The method according to claim 1, wherein the reference value for the rotational wheel speed is a value corresponding to the rotational engine speed.

3. The method according to claim 1, wherein the variable turbine geometry comprises adjustable guide baffles.

4. The method according to claim 3, wherein the reference value for the rotational wheel speed is a value corresponding to the rotational engine speed.

5. The method according to claim 1, wherein the control signal is input to open a blow-off device associated with a turbine of the turbocharger for reducing exhaust back pressure and engine braking power upstream of the turbine.

6. The method according to claim 5, wherein the reference value for the rotational wheel speed is a value corresponding to the rotational engine speed.

7. The method according to claim 6, wherein the variable turbine geometry comprises adjustable guide baffles.

8. The method according to claim 1, wherein the control signal controls closing of brake valves arranged at a cylinder output.

9. The method according to claim 1, wherein the control signal is effective to reduce fuel injection into combustion spaces of the internal combustion engine.

10. The method according to claim 1, comprising the further step of filing maximal engine braking power as a function of the rotational engine speed in a characteristic diagram to which a controller has access for controlling wheel slip.

11. The method according to claim 10, wherein the control signal is effective to reduce fuel injection into combustion spaces of the internal combustion engine.

12. The method according to claim 11, wherein the control signal controls closing of brake valves arranged at a cylinder output.

13. The method according to claim 1, wherein in braking operation, an engine brake and a wheel brake are operated isochronously.

14. The method according to claim 13, wherein the reference value for the rotational wheel speed is a value corresponding to the rotational engine speed.

15. The method according to claim 14, wherein the variable turbine geometry comprises adjustable guide baffles.

16. The method according to claim 15, wherein the control signal is input to open a blow-off device associated with a turbine of the turbocharger for reducing exhaust back pressure and engine braking power upstream of the turbine.

17. The method according to claim 16, wherein the control signal controls closing of brake valves arranged at a cylinder output.

18. The method according to claim 13, wherein a maximum amount of braking power is applied by the engine brake.

19. The method according to claim 18, wherein the control signal is effective to reduce fuel injection into combustion spaces of the internal combustion engine.

20. The method according to claim 19, comprising the further step of filing maximal engine braking power as a function of the rotational engine speed in a characteristic diagram to which a controller has access for controlling wheel slip.

* * * * *